M. HENIUS.
ART OF BREWING.
APPLICATION FILED FEB. 8, 1908.
925,700.
Patented June 22, 1909.
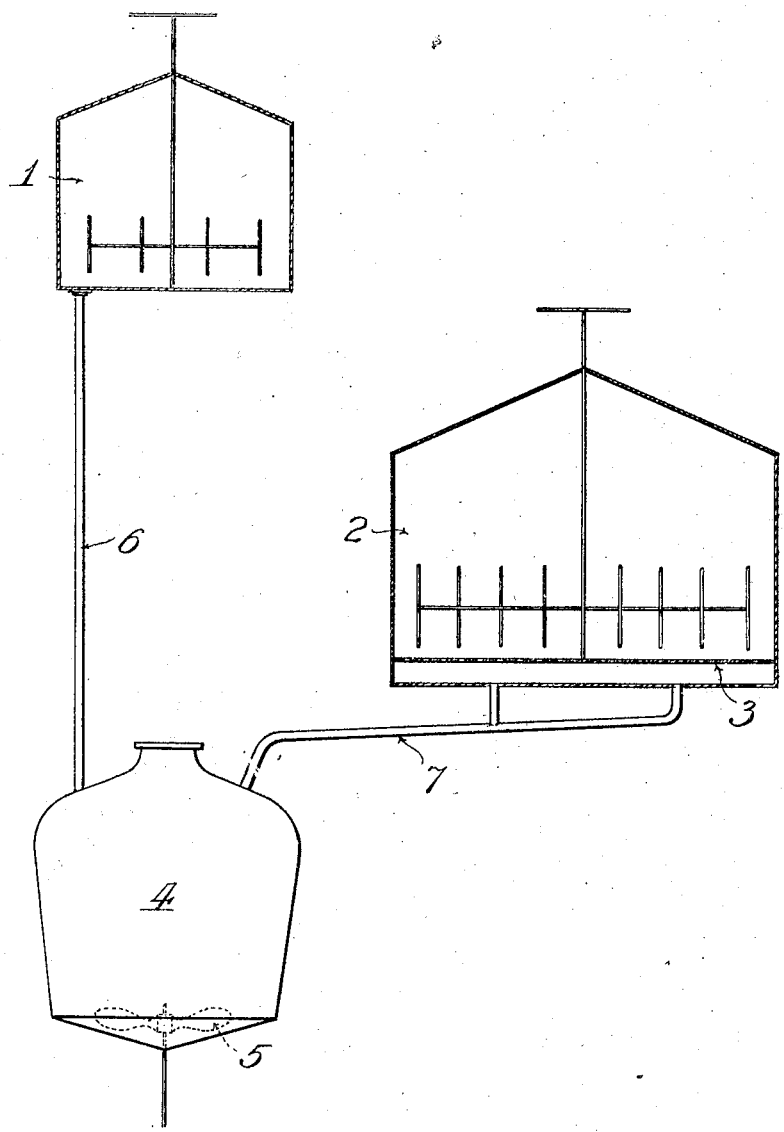

UNITED STATES PATENT OFFICE.

MAX HENIUS, OF CHICAGO, ILLINOIS.

ART OF BREWING.

No. 925,700.   Specification of Letters Patent.   Patented June 22, 1909.

Application filed February 8, 1908. Serial No. 414,870.

*To all whom it may concern:*

Be it known that I, MAX HENIUS, a citizen of the United States, residing at Chicago, in the county of Cook and State of Illinois, have invented a new and useful Improvement in the Art of Brewing, of which the following is a specification.

In the art of brewing beer, the method of producing the wort, as hitherto commonly practiced, is the following: The cereal used (rice, corn-grits or other prepared cereal) is cooked (with or without the addition of crushed malt or a watery extract of malt containing the diastase) to break up the starch, and the cooked mass is introduced into the mash-tun, into which also is introduced the bulk of crushed malt, to enable the cereal and malt to be mixed together; or if the cereal employed be flakes or in other form in which the starch granules are already broken up, it becomes unnecessary to cook it preparatory to introducing it into the mash-tun. After the inversion has taken place in the mash-tun, the liquid is strained therefrom through the entire mass of "grains" therein and through its false bottom, and the resultant wort is introduced into the hop-kettle, where it is boiled and hopped preparatory to subjecting it to the other ordinary succeeding treatments observed in the manufacture of beer, with which subsequent treatments, however, my present invention has nothing to do. I have discovered that the method thus described is not only expensive in the matters of time-consumption and work, and also in the use of apparatus, but in the insufficiency of yield, for the reasons that it takes time to introduce the cooked cereal or the flakes into the mash-tun, that mashing the cereals and malt together in the mash-tun consumes an unnecessary length of time for the inversion, and that the saccharine matter obtained from the cereal portion of the mass has to be filtered through the mass of malt-husks in the mash-tun, and, finally, that the washing-out or "sparging" water used in the mash-tun fails to take out all of the saccharine matter because of the large quantity thereof in the mash-tun.

The object of my invention is to overcome the objections hereinbefore recited, and this I accomplish by avoiding all commingling of the cereal-mash and the malt-mash, the producing of the cereal-mash and of the malt-mash being effected in separated relation one from the other, and in different vessels, avoiding, altogether, the use of the mash-tun for the inverting action, save that of the malt itself.

I employ a cereal product, such as prepared corn, rice or the like, that has been preparatorily treated to eliminate, at least to a large extent, the albuminoids.

To facilitate the understanding of my invention, the accompanying drawing is provided, showing in a diagrammatic way and mainly in section, apparatus suitable for my purpose.

The cereal-cooker is represented at 1, a mash-tun at 2 provided with the ordinary false bottom 3, and which need have no communication with the cooker, and the hop-kettle at 4, which is shown to contain by a dotted representation, as a modification, a suitable stirrer 5 shown as of the propeller type. 6 designates a pipe affording communication between the cooker 1 and the kettle 4.

In the practice of my improved method the cereal used may be cooked in the cooker 1, but where a prepared cereal product as before stated is employed the same may be directly introduced into the kettle 4. The bulk of crushed malt used is mashed in the usual way in the mash-tun 2, and the malt-wort strained therefrom through the false bottom 3 is communicated through the pipe 7 to the kettle 4 containing the cereal-mash. The mixture thus contained in the kettle is inverted, cooked and hopped to prepare it for the subsequent usual or desired treatments in the manufacture of beer, or other products manufactured from the wort.

The primary advantage of my invention is due to the fact, as I have ascertained it to be, that there is no necessity for inverting the cereal-mash or the flakes in the mash-tun, but that the same may be inverted to much greater advantage in the kettle 4. Thus, when the contents of the kettle are at, or practically at, the boiling temperature, which has killed the diastase in them, the wort which enters the kettle from the mash-tun being at or below the final temperature of the malt-mash at which the diastase of the malt is still active, cools the contents of the kettle to such a temperature as will enable the diastase of the malt-wort to effect the inversion of the starch. If desired, the cereal-mash in the kettle may be further cooled by artificial means, including the addition of cold water. Of course, as will be understood, unless the cereal-mash in the kettle has been previously cooled artificially, as above suggested, the first part of the run of the malt-wort into the very hot contents of the kettle will cause the diastase of that wort to be killed, but as the cooling effect of the malt-wort progresses, a mean temperature will be reached at which the diastase of the remainder of that wort will be active to effect the inversion.

From the foregoing explanation of my invention which is to be understood as consisting, in its broadest sense, in effecting the inversion of the starch in the cereal-mash by the action of the diastase of the malt-wort upon the starch of the cereal, it will be seen that the advantages I thereby attain are the following: In the first place the mashing of the cereal being effected in the kettle, all previous straining or filtering of the same is rendered unnecessary, and the percolation of a large quantity of wort into which the cereal product would have been converted, is avoided, whereby material loss thereof, from failure to be thoroughly washed out of the husks in the mash-tun is prevented, thereby saving much time in the operation of producing the wort, and materially augmenting the yield.

It will be understood that when the prepared cereal is introduced directly into the kettle with the required quantity of water, a sufficient quantity of the diastase-containing malt-wort from the mash-tun is introduced into it to effect the inversion thereof by the use of the stirrer 5. Thereupon the contents of the kettle are boiled, and then the remainder of the wort from the malt vessel is introduced into the kettle to complete the inversion.

What I claim as new and desire to secure by Letters Patent is:

1. The method of manufacturing wort from a cereal product (such as prepared corn, rice, or the like) from which the albuminoids have been partially or wholly eliminated, and malt, which consists in mashing the malt by itself, introducing the cereal-product together with the malt-wort containing diastase into one and the same vessel and causing the inversion therein, and thereupon boiling the inverted product.

2. The method of manufacturing wort from a cereal product (such as prepared corn, rice, or the like) from which the albuminoids have been partially or wholly eliminated, and malt, which consists in mashing the malt by itself, mashing said cereal product by itself, adding to said cereal-mash a malt-wort containing diastase, thereby partially inverting the cereal-mash, thereupon boiling the mixture and, after boiling, adding thereto more malt-wort containing diastase, thereby effecting the complete inversion of the cereal-mash.

3. The method of manufacturing wort from a cereal product from which the albuminoids have been partially or wholly eliminated, and malt, which consists in mashing the cereal product and the malt in separated relation and in different vessels, and introducing into the cereal-mash sufficient of the wort-containing diastase from the malt-mash to partially invert the starch of said cereal-mash, thereupon boiling the mixture, then adding more of said malt-wort containing diastase to complete the inversion, and finally boiling the entire mixture.

MAX HENIUS.

In presence of—
A. U. THORIEN,
R. A. SCHAEFER.